3,175,982
TETRAALKYLLEAD COMPOSITIONS
Murray Robert Miller, Claymont, Del., assignor to E. I. du Pont de Nemours and Company, Wilmington, Del., a corporation of Delaware
No Drawing. Filed Apr. 5, 1960, Ser. No. 20,016
4 Claims. (Cl. 252—386)

This invention relates to tetraalkyllead antiknock compositions and to improving their stability and decreasing their corrosiveness to ferrous metals.

Tetraethyllead is a well known antiknock agent for motor fuels. Also, it has been proposed to employ other tetraalkyllead compositions, such as tetramethyllead, mixed tetraalkylleads containing 1 to 3 methyl groups and 3 to 1 ethyl groups, and mixtures of such tetraalkyllead compounds, as antiknock agents. The purified tetraalkyllead compounds are blended with other agents, according to specifications relating to their use, to produce antiknock blends for automotive and aviation fuels. Such antiknock blends are comprised generally of 1 or more tetraalkyllead antiknock compounds, halohydrocarbon scavenging agents for lead in the combustion processes, identifying dyes, and inert solvent oils.

Ordinarily, the tetraalkyllead antiknock compounds are manufactured by alkylating a lead sodium alloy with an alkyl chloride, such as ethyl chloride, methyl chloride, or a mixture of methyl chloride and ethyl chloride. The tetraalkyllead produced in the alkylation reaction usually is separated from the reaction mass by steam distillation. The steam-distilled product is impure, containing a small proportion of finely divided suspended materials, e.g., metallic lead, and objectionable sludge-forming impurities, such as organo derivatives of bismuth (which metal is generally present in the lead used in such process), ethyl lead chlorides and oxides, and a variety of other metallic impurities in trace quantities inherently present in the lead. Such impurities seldom exceed 2 parts per 1,000 parts of tetraalkyllead.

Various methods may be employed to remove the impurities and produce a product having acceptable purity. Suspended matter and the particularly objectionable organobismuth impurities may in large part be removed and destroyed by a variety of methods, as described in U.S. Patents 2,400,383; 2,407,261; 2,407,262; 2,407,263; 2,407,307; 2,426,789; 2,432,321; 2,440,810. For example, the steam-distilled product may be blown with air in the presence of water or in the presence of water containing a sludge deactivating agent and then separated by decantation from the aqueous phase and the sludge-like products formed in the aeration process.

However purified, the tetraalkyllead antiknock agents and the antiknock blends made therefrom are not inert. Though made clear, they are prone to deteriorate and in time become hazy and deposit sludge, especially under the conditions normally employed for their handling, shipping and storing. The blends are stored, transported and handled in drums, shipping and storage tanks, and in other auxiliary equipment, which normally are of ferrous metal construction and subject to corrosion. Invariably, small but troublesome quantities of water and air are present along with the antiknock composition. Under such conditions, in contact with metallic surfaces and in the presence of even relatively minute quantities of water and oxygen, the tetraalkyllead antiknock compoistions are prone to deteriorate, with the formation of haze and sludge. This occurs even though the tetraalkyllead composition had been treated to free it of sludge-forming impurities. The products of this new decomposition contain iron from the equipment, lead from organo lead, and halogen from halohydrocarbon scavenger. Such deterioration constitutes an important economic and technical problem. It is self-perpetuating in that the haze and sludge promote the deterioration. Also the sludge may fire on exposure to or heating in air, and such difficulties have been experienced in bulk storage tanks and in shipping containers.

Further, haze and sludge accompanying the antiknock compound are known to deteriorate gasoline, decreasing its induction period, and may also cause or contribute to the fouling of fuel lines, filters, and fuel induction systems. Concurrent with the formation of haze and sludge from the antiknock composition, under the conditions described above, is the deterioration of the equipment itself, as such conditions are also conducive to the corrosion of metals. The corrosion is further aggravated by the decomposition of the antiknock blend which, by increasing the acidity of the system in the form of halogen acids and metallic lead (which acts as a galvanic couple), accelerates the processes of corrosion. Rusting of a steel tank car, for example, shortens its life and increases the cost of maintaining it in service. Further, the presence of rust scale, together with the insoluble matter of decomposition from the antiknock compound, is troublesome when unloading, since such matter tends to clog delivery lines and filters. As a result, frequent costly and time-consuming cleanings of the equipment are required. Because of the great cost, it is impractical commerically to employ non-corrosive materials of construction or to provide means for excluding water and oxygen from the system and for maintaining the system free of such impurities. Heretofore, various expedients have been suggested for separately controlling either the decomposition of the antiknock compound or the corrosion of the containing vessels. None however have solved the joint problem, as evidenced by the fact that the problem still exists.

It has been proposed to employ corrosion inhibitors that are soluble in the antiknock blends, for example, corrosion inhibitors of the class of aliphatic amine salts of alkyl acid phosphates. These, however, have proved unsatisfactory, particularly as they do not protect against corrosion of wall areas above the liquid level, such "vapor space" corrosion being especially severe in the storage of tetraethyllead antiknock blends.

It is an object of this invention to treat tetraalkyllead antiknock compounds and tetraalkyllead antiknock blends to stablize them against deterioration and against the formation of haze, sludge, and products corrosive to ferrous metals. Another object is to provide tetraalkyllead antiknock compounds and antiknock blends thereof which have improved stability against deterioration and the formation of haze-forming and sludge-forming products. A further object is to provide tetraalkyllead antiknock compounds and antiknock blends thereof having decreased corrosiveness toward ferrous metals, particularly in the vapor space above the liquid agents or blends. Other objects are to provide new compositions of matter and to advance the art. Still other objects will appear hereinafter.

The above and other objects may be accomplished in accord with this invention which comprises a composition consisting essentially of a member of the group consisting of at least one tetraalkyllead antiknock compound and a tetraalkyllead antiknock blend, and from about 0.005% to about 1% by weight of ammonia, or maintaining the tetraalkyllead compounds or blends in contact with such amounts of ammonia.

It has been found that, if ammonia is incorporated into or maintained in contact with a tetraalkyllead antiknock compound, a mixture of tetraalkyllead antiknock compounds, or a tetraalkyllead antiknock blend, the tetraalkyllead antiknock composition shows decreased tendency towards deterioration and the formation of haze, sludge, and corrosive products, and it and its vapors are substantially non-corrosive to ferrous metal surfaces with which it or its vapors may be brought into contact.

The ammonia may be incorporated into the tetraalkyllead compounds or their antiknock blends simply by blowing gaseous ammonia through them, or by storing them in the presence of the desired proportion of aqueous ammonia. It has been found that ammonia is uniquely effective for the purposes of this invention and particularly so in view of the small quantities that are required to protect the antiknock compositions. It has no deleterious effect on the antiknock compositions or on the performance of the fuels in which they are employed. It is volatile and leaves no deposits during combustion processes.

The tetraalkyllead antiknock compounds, which may be treated in accord with this invention, include tetraethyllead, tetramethyllead, methyltriethyllead, dimethyldiethyllead, trimethylethyllead, mixtures of two or more of such tetraalkyllead antiknock compounds and antiknock blends containing any one or more of such tetraalkyllead antiknock compounds. Preferably, and most commonly, this invention will be applied to tetraethyllead, or mixtures of tetraethyllead with tetramethyllead, and most particularly with antiknock blends thereof.

The tetraalkyllead compositions which are to be employed in this invention comprise (1) tetraalkyllead antiknock compounds that have been steam distilled and subjected to oxidizing conditions, as by aeration, and (2) tetraalkyllead antiknock blends. Some tetraalkyllead antiknock compounds are used for purposes other than as antiknock agents and some may be sold to oil refiners who desire to compound their own antiknock blends. In such cases, it is usually desirable to treat the tetraalkyllead compound itself in accord with this invention; this may be before, during or after subjecting it to oxidizing conditions. Most of the tetraalkyllead antiknock compounds are marketed and used as antiknock blends which are blends of the tetraalkyllead antiknock compounds with up to 40% by weight of halohydrocarbon scavenging agents, small amounts of characteristic dyes to identify the particular blend, and a minor proportion of a blending agent which conventionally is an inert solvent oil, usually kerosene. Even if the tetraalkyllead antiknock compound has been purified previously, a haze is formed when the tetraalkyllead is used to prepare such antiknock blends. Therefore, in order to provide antiknock blends of the highest quality, it is preferred to treat such antiknock blends by this invention regardless of the prior history of the tetraalkyllead employed therein.

The halohydrocarbon scavenging agents, as a class, are well known and a great many have been disclosed in the prior art. Conventionally, they are blended with the tetraalkyllead compound in a proportion sufficient to provide at least two atoms of halogen for each atom of lead present in the tetraalkyllead. In the commercial tetraethyllead antiknock blends, either or both of ethylene dichloride and ethylene dibromide are most commonly used as the scavenging agents. The tetraethyllead antiknock blends most commonly in use are of two general types—"Aviation Mix" for use in fuel for aircraft and "Motor Mix" for use in fuel for automobiles. Normally, "Aviation Mix" contains ethylene dibromide as the sole lead scavenging agent in an amount to furnish at least two bromine atoms for each atom of lead. At present, "Motor Mix" usually contains both ethylene dichloride and ethylene dibromide in proportions to furnish about two atoms of chlorine and about one atom of bromine, respectively, for each atom of lead. Blends, containing different proportions of these ethylene dihalides and containing various proportions of other halohydrocarbon scavenging agents, are also available on the market. Such various types of tetraalkyllead antiknock blends may be treated in accord with this invention, during or after the blending operation.

The tetraalkyllead compositions that have been treated with ammonia according to this invention may also contain other additives to aid in obviating deterioration under storage conditions. N,N'-dialkyl-p-phenylene diamines, e.g., N,N'-disecondary butyl-p-phenylenediamine, and alkyl phenols, e.g. 2,6-ditertiary butyl-4-methylphenol, in small amounts (0.01–0.1%), are particularly effective against oxidative deterioration. The antioxidants however are not nearly as effective alone, i.e., in the absence of the ammonia, to reduce corrosion of the container and degradation of the antiknock blend.

The tetraalkyllead antiknock compounds or the antiknock blends thereof may be treated by passing gaseous ammonia through them until they contain from about 0.005% to about 0.2% of ammonia by weight. Up to about 0.2% by weight of ammonia is easily incorporated in the tetraalkyllead compounds and their blends in this manner. As little as 0.005% of ammonia is often beneficial, being effective for the purposes of this invention for short periods of time, usually somewhat less than one month. Ordinarily, there will be introduced at least 0.03% by weight of gaseous ammonia, preferably about 0.2% to saturate the antiknock composition therewith. The tetraalkyllead compound or the blend may contain a small amount of water or may accumulate a small amount of water from the atmosphere. Such amount of water may amount to as much as about 0.02% by weight dissolved or dispersed in the composition. Such water will dissolve at least part of the ammonia, but such aqueous ammonia is also effective for the purposes of this invention.

The ammonia may be added to the tetraalkyllead antiknock composition in the form of aqueous ammonia which is dispersed in the tetraalkyllead antiknock composition. Also, the tetraalkyllead antiknock composition may be simply covered with a layer of aqueous ammonia which is left in contact therewith for the purposes of this invention. The aqueous ammonia solution so employed may provide as little as 0.005% of ammonia by weight of the antiknock composition to provide the beneficial effect for short periods of time. Usually, an amount of aqueous ammonia to provide at least about 0.05% up to about 1% by weight of ammonia based on the antiknock composition will be employed. Such layer of aqueous ammonia usually will be in the proportion of from about 0.05% to about 1% by volume based on the volume of the tetraalkyllead antiknock composition. Still larger amounts of aqueous ammonia can be used but usually will be uneconomical. The aqueous ammonia should contain the ammonia in a concentration of from about 10% to about 30% by weight, preferably about 29% by weight to minimize the quantity of gross water phase in the container. Due to the volatility of the ammonia, some of the ammonia gas will be present in the vapor space above the liquid and that within the antiknock compositions will be present as both gaseous ammonia and dispersed aqueous ammonium hydroxide.

Ordinarily, the treatment with ammonia will be carried out at the prevailing atmospheric temperatures. Satisfactory results have been obtained at temperatures of from about 0° C. to about 50° C.

When the tetraalkyllead antiknock compositions so treated, containing gaseous or aqueous ammonia or covered with a layer of aqueous ammonia, are stored or shipped in tanks, tank cars, drums or other vessels of ferrous metals, the ammonia so in contact with such compositions is effective to materially decrease the corrosiveness of the compositions to those vessels, as well as retarding the deterioration of the compositions.

Since tetraethyllead and its antiknock blends are the most common tetraalkyllead antiknock compositions employed at the present time and are representative of such compositions, the present invention will be exemplified hereinafter as applied to representative tetraethyllead antiknock blends. The tetraethyllead, employed for the preparation of the antiknock blends treated in the examples given hereinafter, had been previously processed as follows:

The steam-distilled product from the ethylation reaction was aerated in the presence of about an equal volume of water, by passing air through the charge under vigorous agitation, until the formation of sludge was substantially complete, i.e., until a test sample of the aerated material formed less than about 0.002 gram of sludge per 100 ml. of tetraethyllead on further aeration, and then separating the tetraethyllead from the aqueous phase and from the sludge.

In order to more clearly illustrate this invention, preferred modes of practicing it, and the advantageous results to be obtained thereby, the following examples are given, in which the proportions employed were by weight and the temperatures atmospheric, except where specifically indicated otherwise:

EXAMPLE 1

1,000 ml. of an aviation type antiknock blend, composed of 61.4 parts by weight of steam-distilled and aerated tetraethyllead, 35.7 parts by weight of ethylene dibromide, 0.03 part by weight of a standard blue dye, and 2.88 parts by weight of kerosene, were placed in a 2000 ml. glass vessel and test coupons of 1020 mild steel, ⅛ x 1 x 2 inches, were suspended in the vapor, liquid, and interface phases. Water or aqueous ammonium hydroxide was added in the amounts tabulated below. The containers were gently shaken intermittently during ⅓ of a 3-week test period. During this time, deposits accumulated on the vapor phase coupons which were visibly iron corrosion product (rust). The liquid phase coupons became discolored by a sludge accretion, heaviest at the interface, which continued to grow. This accretion, arising from tetraethyllead blend decomposition products and iron corrosion product, is composed largely of chemically combined iron, chemically combined and free lead, and usually also halogen as metal halide, with the iron component (taken as Fe) representing about 50% of the sludge. At the end of the test period, the coupons were stripped of the deposits by rinsing with a bromine-carbon tetrachloride solution and then treating with boiling zinc dust in 30% sodium hydroxide. The stripped coupons were then measured for metal loss, which is expressed below as milligrams of Fe per square decimeter of metal surface per day (MDD). This metal loss is a direct measure of the amount of iron that enters into the combined sludge deposit. The coupons were also examined under the microscope for evidence of pitting, cratering, etching, etc., which is the final visible effect of the test on the surface of the metal after the sludge is removed therefrom, indicating the effect of the deterioration of the antiknock blend on the equipment itself.

The results are given in Table I below:

Table I
INHIBITING SLUDGING AND CORROSION WITH AMMONIUM HYDROXIDE

| Composition | Vapor | | Interface | |
|---|---|---|---|---|
| | MDD | Condition of Coupon | MDD | Condition of Coupon |
| Blend +0.5% by volume water. | 54 | Moderate etch and pitting. | 108 | Cratering. |
| Blend +0.5% by volume of 11% NH₄OH. | 2.0 | No visible effect | 10 | Do. |
| Blend +0.5% by volume of 22% NH₄OH. | 0.7 | ___do___ | 0 | No visible effect. |

The effectiveness of ammonia as a sludge inhibitor and a "vapor-phase" corrosion inhibitor is apparent from these data.

EXAMPLE 2

A tetraethyllead antiknock blend was prepared as in Example 1. A 1000 ml. portion of the blend (1742 g.), containing approximately 0.02% by weight of dissolved water, was saturated with ammonia by passing ammonia gas deeply beneath the surface of the charge through a gas sparging tube. A total of 1.3 g. of ammonia was used. The stability of the thus-treated blend was determined by the procedure of Example 1 against that of untreated blend. The results follow:

Table II
INHIBITING SLUDGING AND CORROSION WITH AMMONIA

| Blend | Vapor | | Interface | | Liquid | |
|---|---|---|---|---|---|---|
| | MDD | Condition of Coupon | MDD | Condition of Coupon | MDD | Condition of Coupon |
| Untreated | 71 | M.C. and P | 49 | M.C. | 41 | L.C. |
| Ammoniated | 0.7 | M.E. | 0.7 | L.E. | 0.7 | L.C. |

In the table, M.C. and P means moderate corrosion and pitting; M.E. means moderate etch; L.E. means light etch; and L.C. stands for light corrosion.

EXAMPLE 3

An aviation type antiknock blend was prepared by mixing 61.4 parts by weight of steam-distilled and aerated tetraethyllead, 35.7 parts by weight of ethylene dibromide, 0.03 part by weight of a standard blue dye, and 2.88 parts by weight of kerosene. The blend was hazy and was washed with 10% by weight of a 0.5% citric acid solution, such citric acid treatment representing the best commercial method heretofore known for removing sludge and haze-forming impurities from tetraethyllead compositions.

10 gallon portions of the haze-free, washed blend were placed in 15-gallon steel drums along with 0.05% by volume (about 0.026% by weight) of either water or concentrated (29% by weight) ammonium hydroxide. The drums were sealed and stored outdoors for 5 months, during which time the temperature varied from about 10° C. to 30° C.

The aged blends were sampled for sludge, which had accumulated during the 5 months of storage as follows: Each blend was mixed in its drum by rolling for 15 minutes. Then, a 2-liter sample was taken from near the bottom by siphoning, filtered through fluted filter paper, and the amount of the sludge collected on the filter paper was determined. The blend that was stored in the presence of water formed 0.045 gram of sludge per 100 ml. of blend. The blend that was stored in the presence of the ammonium hydroxide formed 0.006 gram of sludge per 100 ml. of blend.

It will be understood that the preceding Examples have been given for illustrative purposes solely and that this invention is not limited to the specific embodiments described therein. On the other hand, it will be readily apparent to those skilled in the art that the tetraalkyllead compounds, the tetraalkyllead antiknock blends, the proportions of ammonia, and the techniques and conditions employed may be widely varied within the limits set forth in the general description without departing from the spirit or scope of this invention.

From the preceding description, it will be apparent that this invention provides tetraalkyllead antiknock compositions which have materially improved stability and greatly decreased corrosiveness to ferrous metals and, particularly, this invention provides a unique means or method for largely inhibiting the corrosion of those parts of the containers, storage tanks, tank cars and the like which are in contact with the vapors of tetraalkyllead compositions and which are normally corroded thereby. Accordingly, it is apparent that this invention constitutes a valuable advance in and contribution to the art.

The embodiments of the invention in which an exclusive property or privilege is claimed are defined as follows:

1. The process for improving the stability of a tetraalkyllead antiknock composition of the gorup consisting of at least one tetraalkyllead antiknock compound and a tetraalkyllead antiknock blend and decreasing the corrosiveness of said antiknock composition toward a closed ferrous metal vessel containing it, which process comprises maintaining from about 0.005% to about 1% by weight of ammonia in contact with said antiknock composition in said vessel during storage and shipping thereof.

2. The process for improving the stability of a tetraalkyllead antiknock blend and decreasing the corrosiveness of said blend toward a closed ferrous metal vessel containing it, which process comprises maintaining from about 0.005% to about 1% by weight of ammonia in contact with said blend in said vessel during storage and shipping thereof.

3. The process for improving the stability of a tetraalkyllead antiknock blend and decreasing the corrosiveness of said blend toward a closed ferrous metal vessel containing it, which process comprises maintaining from about 0.03% to about 0.2% by weight of gaseous ammonia in contact with said blend in said vessel during storage and shipping thereof.

4. The process for improving the stability of a tetraalkyllead antiknock blend and decreasing the corrosiveness of said blend toward a closed ferrous metal vessel containing it, which process comprises maintaining on the surface of said blend a layer of aqueous ammonium hydroxide which contains from about 10% to about 29% by weight of ammonia and which is in a proportion of from about 0.5% to about 1% by volume based on the volume of said blend in said vessel during storage and shipping thereof.

References Cited by the Examiner

UNITED STATES PATENTS

| 1,395,730 | 11/21 | Reichinstein | 21—2.7 |
| 1,843,942 | 2/32 | Calcott et al. | 44—69 |
| 2,149,033 | 2/39 | Schulze et al. | 44—69 |
| 2,432,321 | 12/47 | Linch | 260—437 |
| 2,621,200 | 12/52 | Kolka et al. | 260—437 |
| 2,755,166 | 7/56 | Marsh | 21—2.7 |

DANIEL E. WYMAN, *Primary Examiner.*

ALPHONSO D. SULLIVAN, JULIUS GREENWALD,
*Examiners.*